(12) United States Patent
Sun et al.

(10) Patent No.: US 11,151,723 B2
(45) Date of Patent: Oct. 19, 2021

(54) IMAGE SEGMENTATION METHOD, APPARATUS, AND FULLY CONVOLUTIONAL NETWORK SYSTEM

(71) Applicant: Hangzhou Hikvision Digital Technology Co., Ltd., Zhejiang (CN)

(72) Inventors: Haiming Sun, Zhejiang (CN); Di Xie, Zhejiang (CN); Shiliang Pu, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 128 days.

(21) Appl. No.: 16/327,682

(22) PCT Filed: Jul. 12, 2017

(86) PCT No.: PCT/CN2017/092614
§ 371 (c)(1),
(2) Date: Feb. 22, 2019

(87) PCT Pub. No.: WO2018/036293
PCT Pub. Date: Mar. 1, 2018

(65) Prior Publication Data
US 2019/0228529 A1    Jul. 25, 2019

(30) Foreign Application Priority Data
Aug. 26, 2016    (CN) .......................... 201610734168.4

(51) Int. Cl.
| | | |
|---|---|---|
| *G06T 7/11* | (2017.01) | |
| *G06T 7/143* | (2017.01) | |
| *G06K 9/62* | (2006.01) | |
| *G06N 3/08* | (2006.01) | |
| *G06N 3/04* | (2006.01) | |

(52) U.S. Cl.
CPC .............. *G06T 7/11* (2017.01); *G06K 9/6256* (2013.01); *G06K 9/6267* (2013.01); *G06N 3/04* (2013.01);
(Continued)

(58) Field of Classification Search
CPC . G06T 7/11; G06T 7/143; G06T 2207/10024; G06K 9/6256; G06K 6/6267; G06N 3/08
See application file for complete search history.

(56) References Cited

U.S. PATENT DOCUMENTS

| | | |
|---|---|---|
| 2015/0117760 A1 | 4/2015 | Wang et al. |
| 2018/0365824 A1* | 12/2018 | Yuh ....................... G06T 7/0012 |

FOREIGN PATENT DOCUMENTS

| | | |
|---|---|---|
| CN | 104067314 A | 9/2014 |
| CN | 104700100 A | 6/2015 |

(Continued)

OTHER PUBLICATIONS

Chen, L. C., Papandreou, G., Kokkinos, I., Murphy, K., & Yuille, A. L. (2016). DeepLab: Semantic Image Segmentation with Deep Convolutional Nets, Atrous Convolution, and Fully Connected CRFs. arXiv preprint arXiv: 1606.00915.*

(Continued)

*Primary Examiner* — Zhitong Chen
(74) *Attorney, Agent, or Firm* — McDonnell Boehnen Hulbert & Berghoff LLP (57) ABSTRACT

The embodiments of the present application provide an image segmentation method, an image segmentation apparatus, and a fully convolutional network system. The method includes: acquiring a target image to be processed; acquiring image feature data of the target image; inputting the image feature data into a pre-trained target network far image segmentation to obtain an output; wherein the target network is a fully convolutional network comprising a hybrid context network structure, and the hybrid context network structure is configured to extract a plurality of reference features at a predetermined scale and fuse them into a target feature that matches a scale of a target object in a segmented image; and wherein the target network is trained with sample images containing target objects at different scales; and obtaining an (Continued)

image segmentation result for the target image based on the output. With this technical solution, the effectiveness of segmentation of target objects of different sizes in the image can be improved while ensuring a large receptive field.

14 Claims, 4 Drawing Sheets

(52) U.S. Cl.
CPC .............. *G06N 3/08* (2013.01); *G06T 7/143* (2017.01); *G06T 2207/10024* (2013.01); *G06T 2207/20081* (2013.01); *G06T 2207/20084* (2013.01)

(56) References Cited

FOREIGN PATENT DOCUMENTS

| | | |
|---|---|---|
| CN | 104778448 A | 7/2015 |
| CN | 105389584 A | 3/2016 |
| CN | 105528575 A | 4/2016 |

OTHER PUBLICATIONS

Yu, F., & Koltun, V. (2015). Multi-scale context aggregation by dilated convolutions. arXiv preprint arXiv: 1511.07122.*

PCT International Search Report and Written Opinion, PCT International Application No. PCT/CN2017/092614, dated Oct. 10, 2017, 9 pages.

Everingham, Mark et al., "The PASCAL Visual Object Classes (VOC) Challenge", International Journal of Computer Vision, vol. 88, No. 2, Sep. 9, 2009, pp. 303-338.

Yu, Fisher et al., "Multi-Scale Context Aggregation by Dilated Convolutions", published as a conference paper at ICLR Apr. 30, 2016, https://arxiv.org/pdf/1511.07122, pp. 1-13.

Chen, Liang-Chieh et al., "DeepLab: Semantic Image Segmentation with Deep Convolutional Nets, Atrous Convolution, and Fully Connected CRFs", Arxiv.org, Cornell University Library, arXiv:1606.00915v1, Jun. 2, 2016, pp. 1-14.

Long, Jonathan et al., "Fully Convolutional Networks for Semantic Segmentation", 2015 IEEE Conference on Computer Vision and Pattern Recognition, Jun. 1, 2015, pp. 3431-3440.

* cited by examiner

IMAGE SEGMENTATION METHOD, APPARATUS, AND FULLY CONVOLUTIONAL NETWORK SYSTEM

The present application is a US national phase under 35 U.S.C. § 371 of international application PCT/CN2017/092614, filed Jul. 12, 2017, which claims priority to Chinese patent application No. 201610734168.4, filed with the China National Intellectual Property Administration on Aug. 26, 2016 and entitled "IMAGE SEGMENTATION METHOD, APPARATUS, AND FULLY CONVOLUTIONAL NETWORK SYSTEM", which is incorporated herein by reference in their entirety.

TECHNICAL FIELD

The present application relates to the field of machine vision, and in particular, to an image segmentation method, an image segmentation apparatus, and a fully convolutional network system.

BACKGROUND

Image segmentation such as semantic segmentation and scene labeling plays a very important role in many applications, such as image understanding, self-driving, which makes image segmentation important for a machine to understand images. The so-called semantic segmentation is to classify pixels in a given image; and the so-called scene labeling is to assign labels to regions in an image according to image semantics. In recent years, the fully convolutional network has significantly improved the performance of the semantic segmentation and scene labeling for images. Specifically, with a good classification performance of the fully convolutional network, dense prediction is performed on the pixels of the image, and a final prediction result is produced by means of a conditional random field at the end. In the relevant art, a fully convolutional network for image segmentation mainly consists of convolutional layers, pooling layers, and activation layers. The fully convolutional network does not have a fully connected layer compared to a convolutional network.

In the fully convolutional network, a large receptive field means that more spatial context information may be considered and the accuracy of the prediction can be improved. The so-called receptive field is a region in an input image corresponding to the response of a certain node of an output feature map. Two approaches are proposed to increase the receptive field in the relevant art. The first one is to enlarge the size of the convolution kernel, and the second is to increase the pooling layer. The first approach will lead to the expansion of parameters, that is, the parameters to be trained are so many that they cannot be trained normally. In the second approach, due to the presence of the pooling layer, the spatial size of the feature map in the network gradually becomes smaller as the network deepens, resulting in a lower resolution. This ultimately leads to poor predictions on the edges of targets in the image by the fully convolutional network. The addition of pooling layers will inevitably reduce the accuracy of predictions on small targets in the image. Atrous convolution has been proposed to solve the above problems to some extent. The atrous convolution introduces zeros to the convolution kernel, enlarging the kernel size without increasing the number of parameters. Moreover, the atrous convolution can help remove some of the pooling layers in the network, so that the feature map remains unchanged as the network deepens. Because of these advantages, atrous convolution is widely used in image segmentation applications.

In addition, in a specific application of image segmentation, the image contains target objects of varying size, namely, there are large target objects and small target objects. A fully convolutional network generally has its own range of sizes, i.e., a certain scale for target objects that the fully convolutional network is best suitable for processing. For example, choosing different dilations in atrous convolution generally makes the fully convolutional network suitable for different scales. Moreover, in the fully convolutional network, the scale of the features extracted by convolution operations is not only proportional to the receptive field of the convolution layer, but also proportional to the dilation of the convolution layer. If the size of the extracted feature is large, the target object with a small size will be omitted. Therefore, how to effectively segment the target objects at different scales in an image while ensuring a large receptive field is a problem worthy of attention.

In the relevant art, there is a fully convolutional network of a structure of ASPP (Atrous spatial pyramid pooling). Specifically, a plurality of branches, each of which consisting of an atrous convolution with a different dilation, are constructed. The results of the plurality of branches are then combined for prediction. However, since the dilation is fixed, the scale of target objects that are most suitable for being processed are fixed, which cause the network used for specific target objects, resulting in insufficient flexibility.

Thus, how to improve the effectiveness of segmenting target objects at different scales in an image while ensuring a large receptive field has become an urgent problem to be solved.

SUMMARY

The purpose of the embodiments of the present application is to provide an image segmentation method, an image segmentation apparatus, and a fully convolutional network system, so as to improve the effectiveness of segmenting target objects at different scales in images while ensuring a large receptive field. The specific technical solutions are as follows.

In a first aspect, an embodiment of the present application provides an image segmentation method including:
acquiring a target image to be processed;
acquiring image feature data of the target image;
inputting the image feature data into a pre-trained target network for image segmentation to obtain an output; wherein the target network is a fully convolutional network including a hybrid context network structure, and the hybrid context network structure is configured to extract a plurality of reference features at a predetermined scale and fuse them into a target feature that matches a scale of a target object in a segmented image; and wherein the target network is trained with sample images containing target objects at different scales; and
obtaining an image segmentation result for the target image based on the output.

Optionally, the hybrid context network structure is a convolution structure having a non-atrous convolution and an atrous convolution.

Optionally, the hybrid context network structure includes at least one hybrid context component; and
each hybrid context component includes: an atrous convolution branch, a non-atrous convolution branch, a channel concatenating layer, and a non-atrous convolution layer, wherein the atrous convolution branch and the non-atrous convolution branch respectively convolve the input of this hybrid context component; the channel concatenating layer concatenates a convolution result from the atrous convolution branch and a convolution result from the non-atrous convolution branch; and the non-atrous convolution layer convolves a result from the channel concatenating layer to produce a convolution result as an output of this hybrid context component.

Optionally, the atrous convolution branch includes at least one atrous convolution, and the non-atrous convolution includes at least one non-atrous convolution.

Optionally, the hybrid context component convolves the input using the following convolution formula:

$$F_{i+1}=\varphi\{W_i[c(\psi(W_kF_i+b_k))]+b_i\}$$

where, $F_i$ denotes a feature map input to the i-th layer, $F_{i+1}$ denotes a feature map output by the i-th layer, $W_k$ denotes a parameter of the atrous convolution branch or the non-atrous convolution branch, $b_k$ denotes an offset item of the atrous convolution branch or the non-atrous convolution branch, $\psi$ denotes an activation function of the atrous convolution branch or the non-atrous convolution branch, c( ) concatenates all input matrices on a channel axis, $W_t$ denotes a parameter of the non-atrous convolution layer, $b_i$ denotes an offset item of the non-atrous convolution layer, and $\varphi$ denotes an activation function of the non-atrous convolution layer.

Optionally, the process of training the target network includes:

building an initial fully convolutional network that includes a hybrid context network structure;

acquiring image feature data of each sample image;

inputting image feature data of the sample images into the initial fully convolutional network for training; and obtaining the target network when a loss value between an output for each trained sample image and a true value of the segmentation of this image is lower than a predetermined threshold.

In a second aspect, an embodiment of the present application provides an image segmentation apparatus including:

a target image acquiring module, configured for acquiring a target image to be processed;

an image feature data acquiring module, configured for acquiring image feature data of the target image;

an image segmentation module, configured for inputting the image feature data into a pre-trained target network for image segmentation to obtain an output; wherein the target network is a fully convolutional network including a hybrid context network structure, and the hybrid context network structure is configured to extract a plurality of reference features at a predetermined scale and fuse them into a target feature that matches a scale of a target object in a segmented image; and wherein the target network is trained with sample images containing target objects at different scales; and a result obtaining module, configured for obtaining an image segmentation result for the target image based on the output.

Optionally, the hybrid context network structure is a convolution structure having a non-atrous convolution and an atrous convolution.

Optionally, the hybrid context network structure includes at least one hybrid context component; and each hybrid context component includes: an atrous convolution branch, a non-atrous convolution branch, a channel concatenating layer, and a non-atrous convolution layer, wherein the atrous convolution branch and the non-atrous convolution branch respectively convolve the input of this hybrid context component; the channel concatenating layer concatenates a convolution result from the atrous convolution branch and a convolution result from the non-atrous convolution branch; and the non-atrous convolution layer convolves a result from the channel concatenating layer to produce a convolution result as an output of this hybrid context component.

Optionally, the atrous convolution branch includes at least one atrous convolution, and the non-atrous convolution includes at least one non-atrous convolution.

Optionally, the hybrid context component convolves the input using the following convolution formula:

$$F_{i+1}=\varphi\{W_i[c(\psi(W_kF_i+b_k))]+b_i\}$$

where, $F_i$ denotes a feature map input to the i-th layer, $F_{i+1}$ denotes a feature map output by the i-th layer, $W_k$ denotes a parameter of the atrous convolution branch or the non-atrous convolution branch, $b_k$ denotes an offset item of the atrous convolution branch or the non-atrous convolution branch, $\psi$ denotes an activation function of the atrous convolution branch or the non-atrous convolution branch, c( ) concatenates all input matrices on a channel axis, $W_i$ denotes a parameter of the non-atrous convolution layer, $b_i$ denotes an offset item of the non-atrous convolution layer, and $\varphi$ denotes an activation function of the non-atrous convolution layer.

Optionally, the target network is trained by a training module, which includes:

a building unit, configured for building an initial fully convolutional network that includes a hybrid context network structure;

a feature data acquiring unit, configured for acquiring image feature data of each sample image;

a training unit, configured for inputting image feature data of the sample images into the initial fully convolutional network for training; and a determination unit, configured for obtaining the target network when a loss value between an output for each trained sample image and a true value of the segmentation of this image is lower than a predetermined threshold.

In a third aspect, an embodiment of the present application further provides a fully convolutional network system including a hybrid context network structure; wherein the hybrid context network structure includes at least one hybrid context component; and each hybrid context component includes: an atrous convolution branch, a non-atrous convolution branch, a channel concatenating layer, and a non-atrous convolution layer, wherein the atrous convolution branch and the non-atrous convolution branch respectively convolve the input of this hybrid context component; the channel concatenating layer concatenates a convolution result from the atrous convolution branch and a convolution result from the non-atrous convolution branch; and the non-atrous convolution layer convolves a result from the channel concatenating layer to produce a convolution result as an output of this hybrid context component.

Optionally, the atrous convolution branch includes at least one atrous convolution, and the non-atrous convolution includes at least one non-atrous convolution.

Optionally, the hybrid context component convolves the input using the following convolution formula:

$$F_{i+1}=\varphi\{W_i[c(\psi(W_kF_i+b_k))]+b_i\}$$

where, $F_i$ denotes a feature map input to the i-th layer, $F_{i+1}$ denotes a feature map output by the i-th layer, $W_k$ denotes a parameter of the atrous convolution branch or the non-atrous convolution branch, $b_k$ denotes an offset item of the atrous convolution branch or the non-atrous convolution branch, ψ denotes an activation function of the atrous convolution branch or the non-atrous convolution branch, c( ) concatenates all input matrices on a channel axis, $W_i$ denotes a parameter of the non-atrous convolution layer, $b_i$ denotes an offset item of the non-atrous convolution layer, and φ denotes an activation function of the non-atrous convolution layer.

In a fourth aspect, an embodiment of the present application further provides an electronic device, including:

a processor and a memory;

the memory storing executable program codes; and the processor executing a program corresponding to the executable program codes stored in the memory to carry out the image segmentation method according to the first aspect of the present application.

In a fifth aspect, the present application provides a storage medium for storing executable program codes that, when executed, perform the image segmentation method according to the first aspect of the present application.

In the embodiments of the present application, the target network for image segmentation is a fully convolutional network with a hybrid context network structure. The hybrid context network structure is capable of extracting a plurality of reference features at a predetermined scale and fusing them into a feature that matches the scale of a target object(s) in the segmented image, such that none of the target objects at various scales in the image will be ignored and the receptive field depends on the convolution with the largest dilation. Therefore, the solution can improve the effectiveness of segmentation of the target objects at different scales in the image and provide a large receptive field at the same time.

BRIEF DESCRIPTION OF THE DRAWINGS

In order to describe the technical solutions of embodiments of the present application and of the prior art more clearly, the drawings used in the embodiments and the prior art will be briefly described. Obviously, the drawings described below are just for some embodiments of the present application, and other drawings may be obtained by those of ordinary skills in the art based on the drawings herein without any creative effort.

DETAILED DESCRIPTION

The embodiments of the present application will now be described in conjunction with the accompanying drawings used in the embodiments of the present application. Obviously, the described embodiments are only some of the embodiments of the present application and not all of them. Based on the embodiments herein, all other embodiments obtained by those of ordinary skills in the art without any creative efforts are within the scope of the present application.

In order to improve the effectiveness of segmentation of target objects of different sizes in an image while ensuring a large receptive field, the embodiments of the present application provide an image segmentation method, an image segmentation apparatus, and a fully convolutional network system. The image segmentation in the embodiment of the present application may be a semantic segmentation of images, or a scene labeling of images, and alternatively may be other approaches of dividing regions in an image, which is not limited herein.

An image segmentation method provided by an embodiment of the present application is first described.

It should be noted that the image segmentation method provided by the embodiment of the present application may be carried out by an image segmentation apparatus. The image segmentation apparatus may be a feature plug-in for image processing software in the relevant art, or may be independent function software. In addition, the image segmentation apparatus is applicable to an electronic device, which may include a terminal device or a server device.

Figure 1:
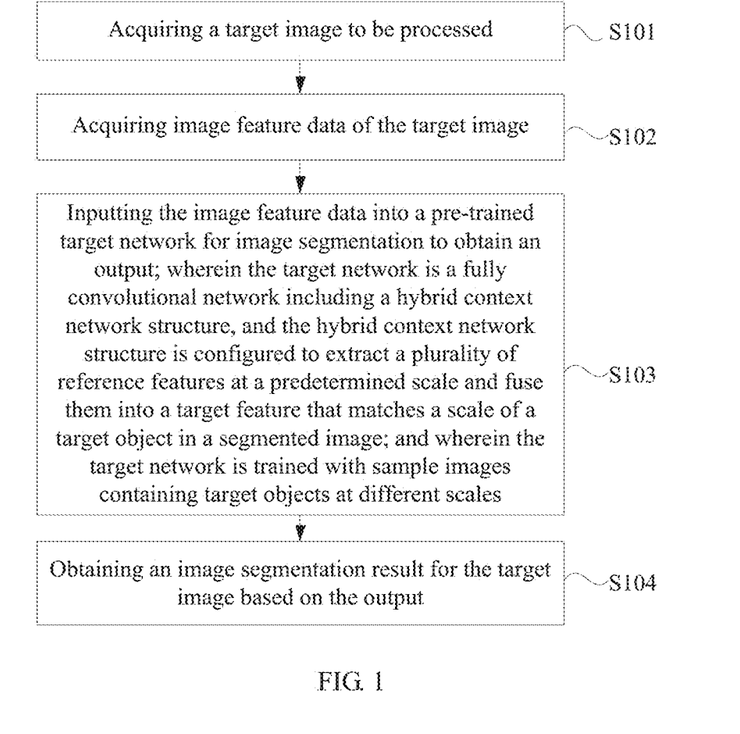
FIG. 1 is a flowchart of an image segmentation method according to an embodiment of the present application.

As shown in FIG. 1, the image segmentation method provided by the embodiment of the present application may include the following steps.

S101, acquiring a target image to be processed.

The target image to be processed may be, for example, acquired locally, or downloaded from the network. The target image may include target objects at different scales. For example, the target image is an image captured by a roadside camera for surveillance, which may contain close-up views, such as cars or pedestrians, and may contain a distant view, such as a bird. The cars and pedestrians as close-up views are target objects at large scale, and the bird as a distant view is a target object at small scale.

It should be noted that the large or small scale or size is a relative concept and does not refer to a specific scale. Generally, for the fully convolutional network in the prior art, if the network is adapted to processing a target object with a large size, it is not suitable for processing a target object at a small scale. The scale or size is a relative concept. For example, for a fully convolutional network A in the relevant art suitable for processing target objects of 100*100 pixels, a target object of 10*10 pixels is a target object at a small scale, and target objects of the small scale will be ignored by the fully convolutional network A. For another example, for a fully convolutional network B suitable for processing target objects of 1000*1000 pixels, a target object of 100*100 pixels may be considered as a target object of a small scale, and target objects of the small scale will be ignored by the fully convolutional network B. That is to say, an image segmentation method using a fully convolutional network in the relevant art is limited a scale. The image segmentation method provided by the embodiment of the present application employs a target network including a hybrid context network structure, and is intended to be suitable for more scales.

S102, acquiring image feature data of the target image.

In order to perform image segmentation on the target image, the image feature data of the target image may be acquired. The image feature data can uniquely identify the target image.

Specifically, the image feature data may include, but is not limited to, a color channel value. For an RGB image, the color channel value is the RGB channel value. In the RGB image and the RGB channel value, "R" represents Red, "G" represents Green, and "B" represents Blue. It can be understood that the image segmentation apparatus may extract the color channel value by calling an external color extractor, or by its built-in program code. The color extractor is function software capable of extracting color channel values of pixels in an image.

S103, inputting the image feature data into a pre-trained target network for image segmentation to obtain an output; wherein the target network is a fully convolutional network including a hybrid context network structure, and the hybrid context network structure is configured to extract a plurality of reference features at a predetermined scale and fuse them into a target feature that matches a scale of a target object in a segmented image; and wherein the target network is trained with sample images containing target objects at different scales.

In order to improve the effectiveness of segmentation of the target objects at different scales in the image while ensuring a large receptive field, the target network for image segmentation is obtained by training in advance. The target network is a fully convolutional network including the hybrid context network structure. That is, the target network is a fully convolutional network including a convolution layer, a pooling layer, and an activation layer, and further includes the hybrid context network structure. Specifically, the hybrid context network structure is configured to extract a plurality of reference features at a predetermined scale and fuse them into the target feature that matches the scale of the target object(s) in the segmented image. The convolution layer is used for convolution processing, the pooling layer is used for upsampling or downsampling, and the activation layer is used to introduce nonlinear factors. For a fully convolutional network structure, there may be only one activation layer and a plurality of convolution layers and pooling layers, and the pooling layers and the activation layer are arranged after the convolution layers.

It can be understood that, due to the hybrid context network structure in the target network, the features of feature maps at different scales can be fused to produce a feature that matches the scale of the target object(s) in the segmented image. In this way, the target network by learning from sample images can automatically adjust the scale that it adapted to. It should be noted that the sample images containing target objects at different scales can be used to train the target network. For illustrative purpose, the process of training the target network will be described later.

In the process of segmenting the target image, after the image feature data of the target image is acquired, the acquired image feature data of the target image is input to the target network to obtain an output.

Specifically, the hybrid context network structure is a convolution structure having a non-atrous convolution and an atrous convolution. The atrous convolution is a convolution that enlarges the convolution kernel by filling the convolution kernel with zeros, and the non-atrous convolution is a standard convolution that does not fill the convolution kernel with zeros to enlarge the convolution kernel. In addition, it should be noted that the dilation is an attribute for atrous convolution, and the dilation of a standard convolution, i.e., a non-atrous convolution, is 1. If a zero is introduced between two elements in the convolution kernel of the standard convolution, the dilation is 2, and if N zeros are introduced, the dilation will be (N+1), and so on.

In an implementation, the hybrid context network structure includes at least one hybrid context component.

Figure 2:
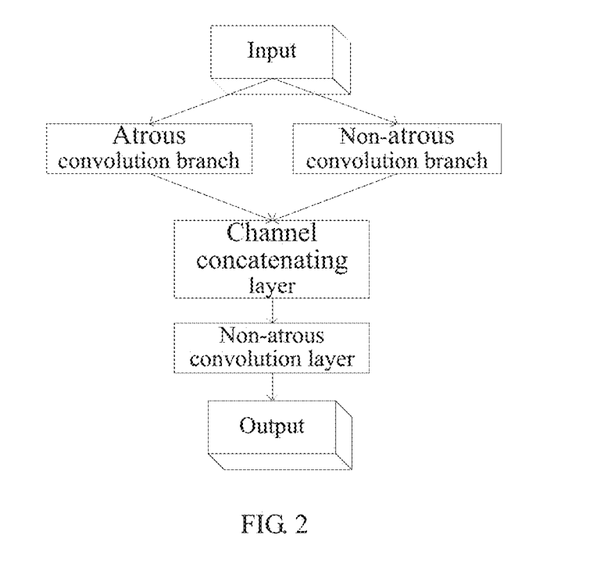
FIG. 2 is a schematic diagram of the structure of a hybrid context component according to an embodiment of the present application.

As shown in FIG. 2, each hybrid context component includes: an atrous convolution branch, a non-atrous convolution branch, a channel concatenating layer, and a non-atrous convolution layer. The atrous convolution branch and the non-atrous convolution branch respectively convolve the input of the hybrid context component to which they belong. The channel concatenating layer concatenates the convolution result from the atrous convolution branch and the convolution result from the non-atrous convolution branch. The non-atrous convolution layer convolves the result from the channel concatenating layer to produce a convolution result as an output of the hybrid context component to which it belongs.

It should be noted that the input of the hybrid context component can be any feature map. The feature map undergoes convolution processing in the atrous convolution branch and the non-atrous convolution branch respectively. In the parallel convolution processes, features at different predetermined scales are respectively extracted. A predetermined scale depends on the dilation. With the operations of the channel concatenating layer and the non-atrous convolution layer, a feature at a new scale is generated, as an output, from the features at predetermined scales. The feature at the new scale is a feature that matches the scale of the target object(s) in the segmented image.

Those skilled in the art will appreciate that for a fully convolutional network in the relevant art, the dilation for the convolution kernel of a convolution layer is fixed. As the receptive field increases, the convolution kernel extracts features at larger scales. The following formula (1) represents a convolution layer.

$$F_{i+1}=\varphi(W_iF_i+b_i) \quad (1)$$

where, $W_i$ is a parameter representing a convolution kernels) of the i-th layer, $F_i$ represents a feature map input to the i-th layer, $F_{i+1}$ represents a feature map output by the i-th layer, $b_i$ represents an offset item, and $\varphi$ represents an activation function. All convolution kernels in $W_i$ are of the same size and have the same dilation.

If a hybrid context component in the hybrid context network structure is considered as a convolution layer, the hybrid context component performs convolutions using the following convolution formula (2):

$$F_{i+1}=\varphi\{W_i[c(\psi(W_kF_i+b_k))]+b_i\} \quad (2)$$

where, $F_i$ represents a feature map input to the i-th layer, $F_{i+1}$ represents a feature map output by the i-th layer, $W_k$ represents a parameter(s) of the atrous convolution branch or the non-atrous convolution branch, $b_k$ represents an offset item of the atrous convolution branch or the non-atrous convolution branch, $\psi$ represents an activation function of the atrous convolution branch or the non-atrous convolution branch, c( ) concatenates all input matrices on a channel axis, $W_i$ represents a parameter(s) of the non-atrous convolution layer, $b_i$ represents an offset item of the non-atrous convolution layer, and $\varphi$ represents an activation function of the non-atrous convolution layer. The function c combines two four-dimensional matrices in their second dimension into a matrix. For example, a matrix of n*c1*h*w and a matrix of n*c2*h*w are combined into an n*(c1+c2)*h*w matrix. In addition, it should be noted that F represents a feature map, which is a matrix. A region of an element in a feature map corresponds to a region in the original image, which is called the receptive field. The receptive field can be regarded as an attribute of the feature map.

Specifically, the size of a convolution kernel of $W_i$ may be 1. $W_k$ can be either an atrous convolution or a non-atrous convolution. It can be understood that the scale of the feature extracted by the convolution is proportional to the dilation of the convolution. That is, the features provided to $W_i$ for filtering include both large and small features.

It can be understood that the receptive field of $F_{i+1}$ depends on the convolution with the largest dilation. That is to say, $F_{i+1}$ can have a large receptive field; and can output large features, small features, or a mixture thereof, depending on the scale of the input image. That is, $F_{i+1}$ outputs a feature that matches the scale of the target object in the segmented image, rather than outputs a feature of only a specific scale as the fully convolutional network in the relevant art does. This undoubtedly leaves the target network with more flexibility, and the target network can learn from specified sample images what kind of combination of scales is the best.

It will be appreciated that the atrous convolution branch includes at least one atrous convolution, and the non-atrous convolution includes at least one non-atrous convolution. When the hybrid context network structure includes at least two hybrid context components, the at least two hybrid context components are connected in series. In addition, it can be understood that when the hybrid context network structure includes a plurality of atrous convolution branches, there must be a plurality of atrous convolutions in the hybrid context network structure. When any atrous convolution branch in the hybrid context network structure includes a plurality of atrous convolutions, there will be a plurality of atrous convolutions in the hybrid context network structure. Further, when there are a plurality of atrous convolutions in the hybrid context network structure, the dilations of the plurality of atrous convolutions may be set according to actual conditions, which is not limited herein.

It should be noted that, in a specific application, the hybrid context network structure can be set in the second half of the entire target network, which is of course not limited thereto. Due to the complexity and variety of the entire network, the specific location for the hybrid context network structure in the network is not limited in the embodiments of the present application. It can be understood that, the target network including the context hybrid network structure provided by the embodiments of the present application can be functionally divided into three parts. The first part is a classification prediction module, the second part is a context comprehensive judgment module, and the third part is a correction module. The hybrid context network structure is the context comprehensive judgment module. Specifically, the classification prediction module is configured to make an initial prediction on a category to which the pixels in the feature map belong. The context comprehensive judgment module is configured to classify the pixels based on the prediction from the context prediction module and more context information. The correction module is configured to correct, based on the output of the context comprehensive judgment module, the borders and small target objects according to more detailed information.

Figure 3:
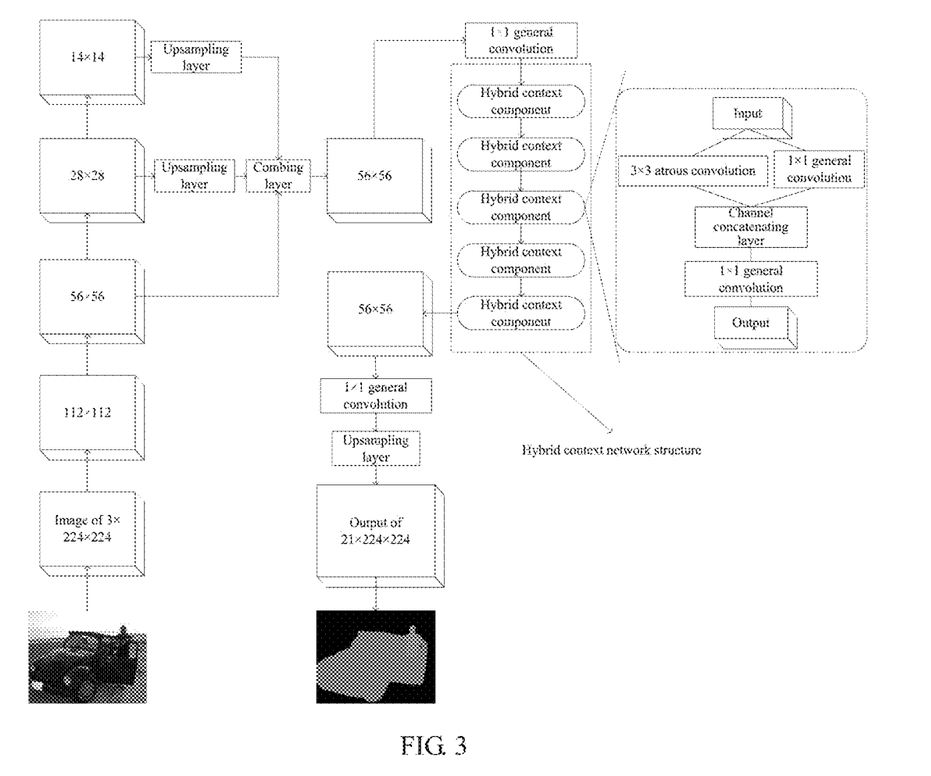
FIG. 3 is a schematic diagram of a target network for segmenting an image listed in an embodiment of the present application.

For example, in a structure of the target network as shown in FIG. 3, the hybrid context network structure includes five hybrid context components. In each hybrid context component, the atrous convolution branch includes an atrous convolution, and the non-atrous convolution branch includes a non-atrous convolution. In addition, the dimensions of feature maps may be 222*224, 112*112, etc. The dimensions of the feature maps reflect the change in the spatial dimensions of the feature map during network operations. It should be noted that the left part in FIG. 3 shows the classification prediction process corresponding to the above-mentioned classification prediction module. The specific network structure corresponding to the classification prediction process is an FCN network generated from a classification network, and the classification network may be any existing classification network. Therefore, FIG. 3 only illustrates the schematic diagram of the feature maps, in order to explain the specific classification prediction process from the perspective of processing the feature maps. FCN stands for Fully Convolutional Network, which converts the fully connected layers of a traditional convolutional neural network into individual convolution layers. The FCN may determine, from abstract features, the category to which each pixel belongs. That is, the classification steps up from the image-level classification to the pixel-level classification.

S104, obtaining an image segmentation result for the target image based on the output.

After the output is obtained, the image segmentation result corresponding to the target image may be obtained based on the output. It can be understood that the output from the target network is some feature data, and the image segmentation result corresponding to the target image can be generated from the feature data.

In the embodiments of the present application, the target network for image segmentation is a fully convolutional network with a hybrid context network structure. The hybrid context network structure is capable of extracting a plurality of reference features with a predetermined scale and fusing them into a feature that matches the scale of a target object(s) in the segmented image, such that the target objects at various scales in the image are not ignored. In addition, the receptive field depends on the convolution with the largest dilation. Therefore, the solution can improve the effectiveness of segmentation of target objects at different scales in the image while ensuring a large receptive field.

For clarity, the process of training the target network is described below.

Figure 4:
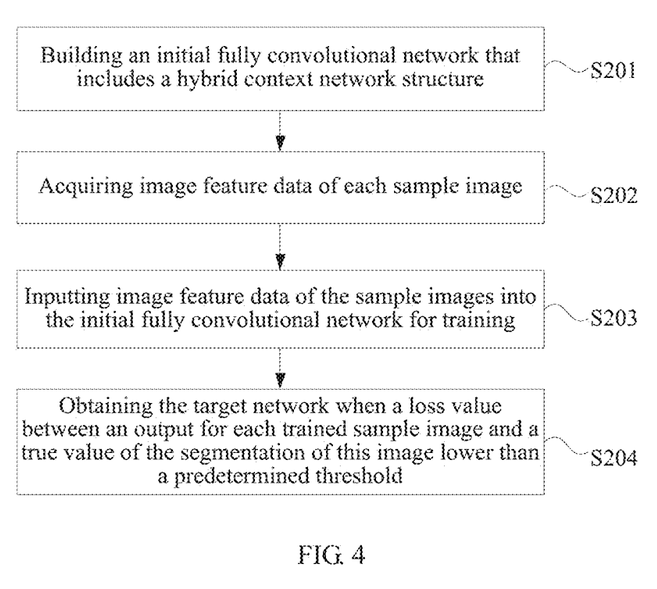
FIG. 4 is a flowchart of a process for training a target network according to an embodiment of the present application.

Specifically, as shown in FIG. 4, the process of training the target network may include:

S201, building an initial fully convolutional network that includes a hybrid context network structure.

The building of the initial fully convolutional network including the hybrid context network structure is to build a fully convolutional network containing a hybrid context network structure. The dilations of the atrous convolution and the non-atrous convolution in the fully convolutional network are set during the building of the target network.

It should be noted that the initial fully convolutional network is a network structure to be trained, i.e., the target network whose parameters have not been trained. The initial fully convolutional network further includes convolution layers, activation layers, and pooling layers. The specific location of the hybrid context network structure in the initial fully convolutional network can be set according to actual conditions. The number of and the positions of the convolution layers, the activation layers, and the pooling layers in the initial fully convolutional network can be set according to actual conditions. Optionally, the relative positions of the convolution layers, the activation layers, and the pooling layers in the built initial fully convolutional network may be set according to certain design principles, for example, arranging the pooling layers and the activation layers after the convolution layers.

S202, acquiring image feature data of each sample image.

The image feature data of the sample image may include, but is not limited to, a color channel value. For an RGB image, the color channel value is an RGB channel value. Optionally, the acquired image feature data of the sample images has a type same as that of the image feature data of the target image described above.

S203, inputting image feature data of the sample images into the initial fully convolutional network for training.

S204, obtaining the target network when a loss value between an output for each trained sample image and a true value of the segmentation of this image lower than a predetermined threshold.

After the image feature data of each sample image is acquired, the image feature data of each sample image may be input to the initial fully convolutional network for training. It is possible to detect in real time whether a loss between the output for each of the trained samples and the true value of the corresponding image segmentation is lower than a preset threshold, and if so, the training process will be ended and the target network is obtained. The true value of the image segmentation corresponding to each sample image is obtained by manual labeling, and the image segmentation true value specifically refers to the image data obtained by segmenting the sample image.

In addition, it should be noted that when the loss value between the output for each of the trained samples and the true value of the corresponding image segmentation is lower than the predetermined threshold, the initial fully convolutional network may be optimized using an optimization algorithm. Specifically, the optimization refers to adjusting parameters of the initial fully convolutional network, for example, the convolution kernels, the stride, and the like. In addition, the optimization algorithm used for optimizing the initial fully convolutional network may be a gradient descent method. The basic working principal of the gradient descent method is to find the minimum value using gradient descent (or the maximum value using gradient ascent). The gradient descent method may include, but is not limited to, a SGD (stochastic gradient descent) algorithm or a Mini batch gradient descent algorithm.

Corresponding to the above method embodiment, an embodiment of the present application also provides an image segmentation apparatus.

Figure 5:
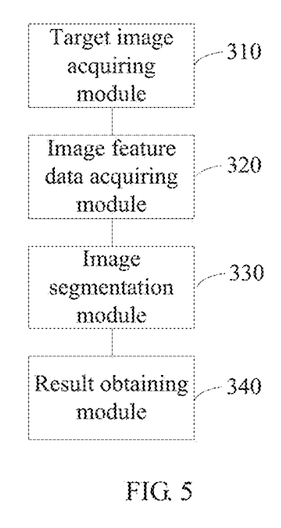
FIG. 5 is a schematic diagram of the structure of an image segmentation apparatus according to an embodiment of the present application.

As shown in FIG. 5, the image segmentation apparatus provided by the embodiment of the present application may include:

a target image acquiring module 310, configured for acquiring a target image to be processed;

an image feature data acquiring module 320, configured for acquiring image feature data of the target image;

an image segmentation module 330, configured for inputting the image feature data into a pre-trained target network for image segmentation to obtain an output; wherein the target network is a fully convolutional network including a hybrid context network structure, and the hybrid context network structure is configured to extract a plurality of reference features at a predetermined scale and fuse them into a target feature that matches a scale of a target object in a segmented image; and wherein the target network is trained with sample images containing target objects at different scales; and a result obtaining module 340, configured for obtaining an image segmentation result for the target image based on the output.

In the embodiments of the present application, the target network for image segmentation is a fully convolutional network with a hybrid context network structure. The hybrid context network structure is capable of extracting a plurality of reference features at a predetermined scale and fusing them into a feature that matches the scale of a target object(s) in the segmented image, such that none of the target objects at various scales in the image will be ignored and the receptive field depends on the convolution with the largest dilation. Therefore, the solution can improve the effectiveness of segmentation of the target objects at different scales in the image and provide a large receptive field at the same time.

Specifically, the hybrid context network structure is a convolution structure having a non-atrous convolution and an atrous convolution.

In an implementation, the hybrid context network structure may include at least one hybrid context component; and each hybrid context component includes an atrous convolution branch, a non-atrous convolution branch, a channel concatenating layer, and a non-atrous convolution layer. The atrous convolution branch and the non-atrous convolution branch respectively convolve the input of the hybrid context component to which they belong. The channel concatenating layer concatenates the convolution result from the atrous convolution branch and the convolution result from the non-atrous convolution branch. The non-atrous convolution layer convolves the result from the channel concatenating layer to produce a convolution result as an output of the hybrid context component to which it belongs.

Specifically, the atrous convolution branch includes at least one atrous convolution, and the non-atrous convolution includes at least one non-atrous convolution.

Specifically, the hybrid context component convolves the input using the following convolution formula:

$$F_{i+1}=\varphi\{W_i[c(\psi(W_k F_i+b_k))]+b_i\}$$

where, $F_i$ denotes a feature map input to the i-th layer, $F_{i+1}$ denotes a feature map output by the i-th layer, $W_k$ denotes a parameter of the atrous convolution branch or the non-atrous convolution branch, $b_k$ denotes an offset item of the atrous convolution branch or the non-atrous convolution branch, $\psi$ denotes an activation function of the atrous convolution branch or the non-atrous convolution branch, c( ) concatenates all input matrices on a channel axis, $W_i$ denotes a parameter of the non-atrous convolution layer, $b_i$ denotes an offset item of the non-atrous convolution layer, and $\varphi$ denotes an activation function of the non-atrous convolution layer.

Specifically, the target network is trained by a training module. The training module includes:

a building unit, configured for building an initial fully convolutional network that includes a hybrid context network structure;

a feature data acquiring unit, configured for acquiring image feature data of each sample image;

a training unit, configured for inputting image feature data of the sample images into the initial fully convolutional network for training; and a determination unit, configured for obtaining the target network when a loss value between an output for each trained sample image and a true value of the segmentation of this image is lower than a predetermined threshold.

An embodiment of the present application further provides a fully convolutional network system, which may be used for image segmentation, and is of course not limited thereto. Specifically, the fully convolutional network system includes a hybrid context network structure.

The hybrid context network structure includes at least one hybrid context component.

Each hybrid context component includes an atrous convolution branch, a non-atrous convolution branch, a channel concatenating layer, and a non-atrous convolution layer. The atrous convolution branch and the non-atrous convolution branch respectively convolve the input of the hybrid context component to which they belong. The channel concatenating layer concatenates the convolution result from the atrous convolution branch and the convolution result from the non-atrous convolution branch. The non-atrous convolution layer convolves the result from the channel concatenating layer to produce a convolution result as an output of the hybrid context component to which it belongs.

It should be noted that the fully convolutional network provided by the embodiment of the present application is a network structure, which includes not only a convolution layer, a pooling layer, and an activation layer, but also a hybrid context network structure.

The structure of the hybrid context component is as shown in FIG. 2. When the hybrid context network structure includes at least two hybrid context components, the at least two hybrid context components are connected in series.

It can be understood that, due to the addition of a hybrid context network structure in the fully convolutional network, the features of feature maps at different scales can be fused to a feature that matches the scale of the target objects in the segmented image. In this way, the target network by learning from sample images can automatically adjust the scale that it adapted to. Sample images containing target objects at different scales can be used to train the fully convolutional network.

It should be noted that the input of the hybrid context component can be any feature map. The feature map undergoes convolution processing in the atrous convolution branch and the non-atrous convolution branch respectively. In the parallel convolution processes, features at different predetermined scales are respectively extracted. A predetermined scale depends on the dilation. With the operations of the channel concatenating layer and the non-atrous convolution layer, a feature at a new scale is generated, as an output, from the features at predetermined scales. The feature at the new scale is a feature that matches the scale of the target object(s) in the segmented image.

In a specific application, the hybrid context network structure can be set in the second half of the entire target network, which is of course not limited thereto. Due to the complexity and variety of the entire network, the specific location for the hybrid context network structure in the network is not limited in the embodiments of the present application. It can be understood that, the target network including the context hybrid network structure provided by the embodiments of the present application can be functionally divided into three parts. The first part is a classification prediction module, the second part is a context comprehensive judgment module, and the third part is a correction module. The hybrid context network structure is the context comprehensive judgment module. Specifically, the classification prediction module is configured to make an initial prediction on a category to which the pixels in the feature map belong. The context comprehensive judgment module is configured to classify the pixels based on the prediction from the context prediction module and more context information. The correction module is configured to correct, based on the output of the context comprehensive judgment module, the borders and small target objects according to more detailed information. For example, in a structure of the target network as shown in FIG. 3, the hybrid context network structure includes five hybrid context components. In each hybrid context component, the atrous convolution branch includes an atrous convolution, and the non-atrous convolution branch includes a non-atrous convolution. In addition, the dimensions of feature maps may be 222*224, 112*112, etc. The dimensions of the feature maps reflect the change in the spatial dimensions of the feature map during network operations. It should be noted that the left part in FIG. 3 shows the classification prediction process corresponding to the above-mentioned classification prediction module. The specific network structure corresponding to the classification prediction process is an FCN network generated from a classification network, and the classification network may be any existing classification network. Therefore, FIG. 3 only illustrates the schematic diagram of the feature maps, in order to explain the specific classification prediction process from the perspective of processing the feature maps. FCN stands for Fully Convolutional Network, which converts the fully connected layers of a traditional convolutional neural network into individual convolution layers. The FCN may determine, from abstract features, the category to which each pixel belongs. That is, the classification steps up from the image-level classification to the pixel-level classification.

In the embodiments of the present application, the target network for image segmentation is a fully convolutional network with a hybrid context network structure. The hybrid context network structure is capable of extracting a plurality of reference features at a predetermined scale and fusing them into a feature that matches the scale of a target object(s) in the segmented image, such that none of the target objects at various scales in the image will be ignored and the receptive field depends on the convolution with the largest dilation. Therefore, the solution can improve the effectiveness of segmentation of the target objects at different scales in the image and provide a large receptive field at the same time.

Specifically, the atrous convolution branch includes at least one atrous convolution, and the non-atrous convolution includes at least one non-atrous convolution. In addition, it can be understood that when the hybrid context network structure includes a plurality of atrous convolution branches, there must be a plurality of atrous convolutions in the hybrid context network structure. When any atrous convolution branch in the hybrid context network structure includes a plurality of atrous convolutions, there will be a plurality of atrous convolutions in the hybrid context network structure. Further, when there are a plurality of atrous convolutions in the hybrid context network structure, the dilations of the plurality of atrous convolutions may be set according to actual conditions, which is not limited herein.

Specifically, the hybrid context component convolves the input using the following convolution formula:

$$F_{i+1} = \varphi\{W_i[c(\psi(W_k F_i + b_k))] + b_i\}$$

where, $F_i$ represents a feature map input to the i-th layer, $F_{i+1}$ represents a feature map output by the i-th layer, $W_k$ represents a parameter(s) of the atrous convolution branch or the non-atrous convolution branch, $b_k$ represents an offset item of the atrous convolution branch or the non-atrous convolution branch, $\psi$ represents an activation function of the atrous convolution branch or the non-atrous convolution branch, $c(\ )$ concatenates all input matrices on a channel axis, $W_i$ represents a parameter(s) of the non-atrous convolution layer, $b_i$ represents an offset item of the non-atrous convolution layer, and $\varphi$ represents an activation function of the non-atrous convolution layer. The function c combines two four-dimensional matrices in their second dimension into a matrix. For example, a matrix of n*c1*h*w and a matrix of n*c2*h*w are combined into an n*(c1−c2)*h*w matrix. In addition, it should be noted that F represents a feature map, which is a matrix. A region of an element in a feature map corresponds to a region in the original image, which is called the receptive field. The receptive field can be regarded as an attribute of the feature map.

Specifically, the size of a convolution kernel of $W_i$ may be 1. $W_k$ can be either an atrous convolution or a non-atrous convolution. It can be understood that the scale of the feature extracted by the convolution is proportional to the dilation of the convolution. That is, the features provided to $W_i$ for filtering include both large and small features.

It can be understood that the receptive field of $F_{i+1}$ depends on the convolution with the largest dilation. That is to say, $F_{i+1}$ can have a large receptive field; and can output large features, small features, or a mixture thereof depending on the scale of the input image. That is, $F_{i+1}$ outputs a feature that matches the scale of the target object in the segmented image, rather than outputs a feature of only a specific scale as the fully convolutional network in the relevant art does. This undoubtedly leaves the target network with more flexibility, and the target network can learn from specified sample images what kind of combination of scales is the best.

Accordingly, an embodiment of the present application further provides an electronic device, including:

a processor and a memory.

The memory stores executable program codes.

The processor executes a program corresponding to the executable program codes stored in the memory to carry out the image segmentation method according to an embodiment of the present application. The image segmentation method includes:

acquiring a target image to be processed;

acquiring image feature data of the target image;

inputting the image feature data into a pre-trained target network for image segmentation to obtain an output; wherein the target network is a fully convolutional network including a hybrid context network structure, and the hybrid context network structure is configured to extract a plurality of reference features at a predetermined scale and fuse them into a target feature that matches a scale of a target object in a segmented image; and wherein the target network is trained with sample images containing target objects at different scales; and obtaining an image segmentation result for the target image based on the output.

Figure 6:
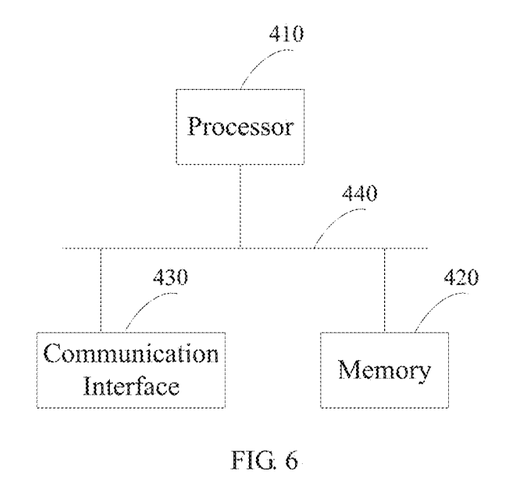
FIG. 6 is a schematic diagram of the structure of an electronic device according to an embodiment of the present application.

Accordingly, as shown in FIG. 6, an embodiment of the present application further provides an electronic device, including:

a processor 410, a memory 420, a communication interface 430, and a bus 440.

The processor 410, the memory 420 and the communication interface 430 are connected by the bus 440 and communicate with each other via the bus 440.

The memory 420 stores executable program codes.

The processor 410 executes a program corresponding to the executable program codes stored in the memory 420 to carry out the image segmentation method according to an embodiment of the present application, wherein the image segmentation method includes:

acquiring a target image to be processed;

acquiring image feature data of the target image;

inputting the image feature data into a pre-trained target network for image segmentation to obtain an output; wherein the target network is a fully convolutional network including a hybrid context network structure, and the hybrid context network structure is configured to extract a plurality of reference features at a predetermined scale and fuse them into a target feature that matches a scale of a target object in a segmented image; and wherein the target network is trained with sample images containing target objects at different scales; and obtaining an image segmentation result for the target image based on the output.

In the embodiments of the present application, the target network for image segmentation is a fully convolutional network with a hybrid context network structure. The hybrid context network structure is capable of extracting a plurality of reference features at a predetermined scale and fusing them into a feature that matches the scale of a target object(s) in the segmented image, such that none of the target objects at various scales in the image will be ignored and the receptive field depends on the convolution with the largest dilation. Therefore, the solution can improve the effectiveness of segmentation of the target objects at different scales in the image and provide a large receptive field at the same time.

Accordingly, an embodiment of the present application also provides a storage medium for storing executable program codes that, when executed, perform the image segmentation method according to an embodiment of the present application, wherein, the image segmentation method includes:

acquiring a target image to be processed;

acquiring image feature data of the target image;

inputting the image feature data into a pre-trained target network for image segmentation to obtain an output; wherein the target network is a fully convolutional network including a hybrid context network structure, and the hybrid context network structure is configured to extract a plurality of reference features at a predetermined scale and fuse them into a target feature that matches a scale of a target object in a segmented image; and wherein the target network is trained with sample images containing target objects at different scales; and obtaining an image segmentation result for the target image based on the output.

In the embodiments of the present application, the target network for image segmentation is a fully convolutional network with a hybrid context network structure. The hybrid context network structure is capable of extracting a plurality of reference features at a predetermined scale and fusing them into a feature that matches the scale of a target object(s) in the segmented image, such that none of the target objects at various scales in the image will be ignored and the receptive field depends on the convolution with the largest dilation. Therefore, the solution can improve the effectiveness of segmentation of the target objects at different scales in the image and provide a large receptive field at the same time.

Accordingly, an embodiment of the present application also provides an application program, which is configured to perform the image segmentation method according to an embodiment of the present application, wherein the image segmentation method includes:

acquiring a target image to be processed;

acquiring image feature data of the target image;

inputting the image feature data into a pre-trained target network for image segmentation to obtain an output;

wherein the target network is a fully convolutional network including a hybrid context network structure, and the hybrid context network structure is configured to extract a plurality of reference features at a predetermined scale and fuse them into a target feature that matches a scale of a target object in a segmented image; and wherein the target network is trained with sample images containing target objects at different scales; and obtaining an image segmentation result for the target image based on the output.

In the embodiments of the present application, the target network for image segmentation is a fully convolutional network with a hybrid context network structure. The hybrid context network structure is capable of extracting a plurality of reference features at a predetermined scale and fusing them into a feature that matches the scale of a target object(s) in the segmented image, such that none of the target objects at various scales in the image will be ignored and the receptive field depends on the convolution with the largest dilation. Therefore, the solution can improve the effectiveness of segmentation of the target objects at different scales in the image and provide a large receptive field at the same time.

Since the embodiments of the apparatus, the electronic device, the storage medium and the application program are basically similar to the method embodiments, they are simply described. For related parts, reference may be made to the portion of the description for the method embodiments.

It should be noted that, the relationship terms herein such as "first", "second" and the like are only used to distinguish one entity or operation from another entity or operation, but do not necessarily require or imply that there is actual relationship or order between these entities or operations. Moreover, the terms "include", "comprise" or any other variants thereof are intended to cover a non-exclusive inclusion, such that processes, methods, articles, or devices comprising a series of elements comprise not only those elements listed but also those not specifically listed or the elements intrinsic to these processes, methods, articles, or equipment. Without further limitations, elements defined by the wording "comprise(s) a . . . " or "include(s) a . . . " do not exclude that there are other identical elements in the processes, methods, articles, or devices which comprise these elements.

The embodiments in the specification are all described in related manners, and the same or similar parts of the embodiments may refer to each other. Each embodiment focuses on a feature different from that of other embodiments. In particular, for the apparatus embodiments, since they are substantially similar to the method embodiments, the description of them is relatively simple, and the relevant parts can be referred to the description of the method embodiment.

It will be understood by those of ordinary skill in the art that all or some of the steps in the method described above may be performed by associated hardware instructed by a program that is stored in a computer-readable storage medium, such as ROM/RAM, magnetic disks, optical disks, etc.

The above description is only for the preferred embodiments of the present application and is not intended to limit the protection scope of the present application. Any modification, equivalent substitutions, improvements etc. made within the spirit and principle of the present application are all included in the protection scope of the present application.

The invention claimed is:

1. An image segmentation method, comprising:
acquiring a target image to be processed, wherein the target image contains target objects at different scales;
acquiring image feature data of the target image;
inputting the image feature data into a pre-trained target network for image segmentation to obtain an output;
wherein the target network is a fully convolutional network comprising a hybrid context network structure, and the hybrid context network structure is configured to extract a plurality of reference features at a predetermined scale and fuse them into a target feature that matches a scale of a target object in a segmented image; and wherein the target network is trained with sample images containing target objects at different scales; and
obtaining an image segmentation result for the target image based on the output;
wherein the hybrid context network structure is a convolution structure having a non-atrous convolution and an atrous convolution;
wherein the hybrid context network structure comprises at least one hybrid context component; and each hybrid context component comprises: an atrous convolution branch, a non-atrous convolution branch, a channel concatenating layer, and a non-atrous convolution layer, wherein the atrous convolution branch and the non-atrous convolution branch respectively convolve the input of this hybrid context component; the channel concatenating layer concatenates a convolution result from the atrous convolution branch and a convolution result from the non-atrous convolution branch; and the non-atrous convolution layer convolves a result from the channel concatenating layer to produce a convolution result as an output of this hybrid context component.

2. The method of claim 1, wherein the atrous convolution branch comprises at least one atrous convolution, and the non-atrous convolution comprises at least one non-atrous convolution.

3. The method of claim 1, wherein the hybrid context component convolves the input using the following convolution formula:

$$F_{i+1} = \varphi\{W_i[c(\psi(W_k F_i + b_k))] + b_i\}$$

where, F denotes a feature map input to the i-th layer, F+' denotes a feature map output by the i-th layer, W denotes a parameter of the atrous convolution branch or the non-atrous convolution branch, bk denotes an offset item of the atrous convolution branch or the non-atrous convolution branch, V denotes an activation function of the atrous convolution branch or the non-atrous convolution branch, cO concatenates all input matrices on a channel axis, denotes a parameter of the non-atrous convolution layer, b denotes an offset item of the non-atrous convolution layer, and (P denotes an activation function of the non-atrous convolution layer.

4. The method of claim 1, wherein the process of training the target network comprises:
building an initial fully convolutional network that comprises a hybrid context network structure;
acquiring image feature data of each sample image;
inputting image feature data of the sample images into the initial fully convolutional network for training; and
obtaining the target network when a loss value between an output for each trained sample image and a true value of the segmentation of this image is lower than a predetermined threshold.

5. A fully convolutional network system, comprising a hybrid context network structure; wherein
the hybrid context network structure comprises at least one hybrid context component; and
each hybrid context component comprises: an atrous convolution branch, a non-atrous convolution branch, a channel concatenating layer, and a non-atrous convolution layer, wherein the atrous convolution branch and the non-atrous convolution branch respectively convolve the input of this hybrid context component; the channel concatenating layer concatenates a convolution result from the atrous convolution branch and a convolution result from the non-atrous convolution branch; and the non-atrous convolution layer convolves a result from the channel concatenating layer to produce a convolution result as an output of this hybrid context component; and the hybrid context network structure is configured to extract a plurality of reference features at a predetermined scale and fuse them into a target feature that matches a scale of a target object in a segmented image.

6. The fully convolutional network system of claim 5, wherein the atrous convolution branch comprises at least one atrous convolution, and the non-atrous convolution comprises at least one non-atrous convolution.

7. The fully convolutional network system of claim 5, wherein the hybrid context component convolves the input using the following convolution formula:

$$F_{i+1}=\varphi\{W_i[c(\psi(W_k F_i+b_k))]+b_i\}$$

where, $F_i$ denotes a feature map input to the i-th layer, $F_{i+1}$ denotes a feature map output by the i-th layer, $W_k$ denotes a parameter of the atrous convolution branch or the non-atrous convolution branch, $b_k$ denotes an offset item of the atrous convolution branch or the non-atrous convolution branch, $\psi$ denotes an activation function of the atrous convolution branch or the non-atrous convolution branch, c( ) concatenates all input matrices on a channel axis, $W_i$ denotes a parameter of the non-atrous convolution layer, $b_i$ denotes an offset item of the non-atrous convolution layer, and $\varphi$ denotes an activation function of the non-atrous convolution layer.

8. An electronic device, comprising:
a processor and a memory;
the memory storing executable program codes; and
the processor executing a program corresponding to the executable program codes stored in the memory to carry out an image segmentation method, the method comprising:
acquiring a target image to be processed, wherein the target image contains target objects at different scales;
acquiring image feature data of the target image;
inputting the image feature data into a pre-trained target network for image segmentation to obtain an output; wherein the target network is a fully convolutional network comprising a hybrid context network structure, and the hybrid context network structure is configured to extract a plurality of reference features at a predetermined scale and fuse them into a target feature that matches a scale of a target object in a segmented image; and wherein the target network is trained with sample images containing target objects at different scales; and
obtaining an image segmentation result for the target image based on the output;
wherein the hybrid context network structure is a convolution structure having a non-atrous convolution and an atrous convolution;
wherein the hybrid context network structure comprises at least one hybrid context component and each hybrid context component comprises: an atrous convolution branch, a non-atrous convolution branch, a channel concatenating layer, and a non-atrous convolution layer, wherein the atrous convolution branch and the non-atrous convolution branch respectively convolve the input of this hybrid context component; the channel concatenating layer concatenates a convolution result from the atrous convolution branch and a convolution result from the non-atrous convolution branch; and the non-atrous convolution layer convolves a result from the channel concatenating layer to produce a convolution result as an output of this hybrid context component.

9. The electronic device of claim 8, wherein the hybrid context network structure is a convolution structure having a non-atrous convolution and an atrous convolution.

10. The electronic device of claim 9, wherein the hybrid context network structure comprises at least one hybrid context component; and
each hybrid context component comprises: an atrous convolution branch, a non-atrous convolution branch, a channel concatenating layer, and a non-atrous convolution layer, wherein the atrous convolution branch and the non-atrous convolution branch respectively convolve the input of this hybrid context component; the channel concatenating layer concatenates a convolution result from the atrous convolution branch and a convolution result from the non-atrous convolution branch; and the non-atrous convolution layer convolves a result from the channel concatenating layer to produce a convolution result as an output of this hybrid context component.

11. The electronic device of claim 10, wherein the atrous convolution branch comprises at least one atrous convolution, and the non-atrous convolution comprises at least one non-atrous convolution.

12. The electronic device of claim 10, wherein the hybrid context component convolves the input using the following convolution formula:

$$F_{i+1}=\varphi\{W_i[c(\psi(W_k F_i+b_k))]+b_i\}$$

where, $F_i$ denotes a feature map input to the i-th layer, $F_{i+1}$ denotes a feature map output by the i-th layer, $W_k$ denotes a parameter of the atrous convolution branch or the non-atrous convolution branch, $b_k$ denotes an offset item of the atrous convolution branch or the non-atrous convolution branch, $\psi$ denotes an activation function of the atrous convolution branch or the non-atrous convolution branch, c( ) concatenates all input matrices on a channel axis, $W_i$ denotes a parameter of the non-atrous convolution layer, $b_i$ denotes an offset item of the non-atrous convolution layer, and $\varphi$ denotes an activation function of the non-atrous convolution layer.

13. The electronic device of claim 8, wherein the process of training the target network comprises:
building an initial fully convolutional network that comprises a hybrid context network structure;
acquiring image feature data of each sample image;
inputting image feature data of the sample images into the initial fully convolutional network for training; and
obtaining the target network when a loss value between an output for each trained sample image and a true value of the segmentation of this image is lower than a predetermined threshold.

14. A non-transitory storage medium for storing executable program codes that, when executed, perform the image segmentation method of claim 1.

\* \* \* \* \*